United States Patent [19]

Usher et al.

[11] Patent Number: 4,601,476
[45] Date of Patent: Jul. 22, 1986

[54] SQUEAK FREE SEAL FOR EXHAUST COUPLINGS

[75] Inventors: Peter P. Usher, Union; Eugene J. Gavaletz, Toms River, both of N.J.

[73] Assignee: Metex Corporation, Edison, N.J.

[21] Appl. No.: 675,709

[22] Filed: Nov. 28, 1984

[51] Int. Cl.⁴ .................. F16J 15/12; B32B 31/06
[52] U.S. Cl. .................. 277/230; 277/101;
277/105; 277/235 R; 264/103; 264/258;
264/268; 264/324; 264/512; 264/516; 285/368;
285/412; 285/910; 285/917; 428/36; 428/242;
428/288; 428/290
[58] Field of Search ............ 277/1, 12, 30, 102,
277/101, 105, 106, 204, 227, 228, 229, 230, 235
R, 235 B, 236, DIG. 6; 285/DIG. 11, DIG. 18,
187, 363, 368, 405, 412; 264/258, 268, 103, 273,
324, 501, 512, 516, 563, 320; 428/242, 288, 36,
290

[56] References Cited

U.S. PATENT DOCUMENTS

| 1,137,373 | 4/1915 | Aylsworth . | |
|---|---|---|---|
| 2,836,436 | 5/1958 | Bianchi | 285/113 |
| 3,404,061 | 10/1968 | Shane et al. | 161/125 |
| 3,519,281 | 7/1970 | Teucher et al. | 277/206 |
| 3,957,278 | 5/1976 | Rabe | 277/227 |
| 4,097,071 | 6/1978 | Crawford et al. | 285/267 X |
| 4,201,804 | 5/1980 | Stecher et al. | 427/393.6 |
| 4,209,177 | 6/1980 | Hall | 277/101 |
| 4,212,602 | 7/1980 | Buran et al. | 418/178 |
| 4,284,282 | 8/1981 | Lonne | 277/235 |
| 4,355,068 | 10/1982 | Beyer et al. | 428/290 |
| 4,373,735 | 2/1983 | Morsbach et al. | 277/235 |
| 4,417,733 | 11/1983 | Usher | 285/DIG. 11 X |
| 4,434,989 | 3/1984 | Beyer et al. | 277/235 |
| 4,554,084 | 11/1985 | Lonne et al. . | |

FOREIGN PATENT DOCUMENTS

| 3107920 | 5/1982 | Fed. Rep. of Germany . | |
| 59-93568 | 5/1984 | Japan | 277/227 |

*Primary Examiner*—Robert S. Ward

[57] ABSTRACT

A heat cured exhaust seal, adapted to be interposed between a pair of confronting pipes in sealing relationship therewith, is formed of wire mesh having openings between the wires thereof and a mixture of metallic fibers, non-metallic filler, a thermally stable lubricant and resin binder, which mixture surrounds the wires and substantially fills the openings in the mesh and forms the seal. The method of forming the seal includes placing a preform of wire mesh into a die cavity, forming a powder mixture of metallic fibers, non-metallic filler, a thermally stable lubricant and a resin binder, placing the powder mixture into the die cavity, pressing the wire mesh and powder mixture to the final size and shape of the seal and curing the seal at an elevated temperature.

7 Claims, 4 Drawing Figures

SQUEAK FREE SEAL FOR EXHAUST COUPLINGS

The invention relates to high temperature seals of the type used in automobile exhaust systems and, more particularly, to an exhaust seal capable of relatively noiseless operation.

Typically in the new front wheel drive automobiles, the engine is mounted so that its crankshaft runs transversely with respect to the vehicle body. The exhaust systems for these "transversely mounted engines" include an exhaust manifold pipe which extends downwardly alongside the engine and has a flange at its open end. Due to the normal movement of the engine during operation (resulting from the rotational momentum of the crankshaft and opposing torsional forces of the drive shaft) the exhaust manifold pipe flange reciprocates in such a manner that the central axis of the pipe, which is perpendicular to the plane of the flange, departs from a substantially vertical line and becomes inclined alternately towards the front and rear of the vehicle. It is therefore necessary to use a flexible joint between the exhaust manifold and the tail pipe to absorb this movement which would otherwise be communicated directly to the tail pipe, causing intolerable stresses and strains and resulting in metal fatigue and the accelerated failure of the tail pipe.

It will therefore be understood that with a transversely mounted engine, the exhaust seal in the flexible joint (typically a ball and socket type joint) connecting the exhaust manifold with the tail pipe must be capable of permitting a degree of relative rotation between the exhaust manifold and exhaust pipe and still maintain an effective exhaust gas seal.

Commonly owed and copending U.S. patent application Ser. No. 527,247, entitled "Exhaust Seal" and filed Aug. 29, 1983, describes an exhaust seal in which flexible sheet graphite is used to form the rubbing surfaces of the seal, which seal has been found to permit a degree of relative rotation between the exhaust manifold and tail pipe while still maintaining an effective exhaust gas seal. During use of the exhaust seal described in application Ser. No. 527,247 as well as other graphite surfaced seals, it has been found that audible sounds or squeaks can be generated as the opposing members of the articulated exhaust pipe joint move with respect to each other and rub against the surfaces of the seal. The audible sounds, while not effecting the actual performance of the seal, can in some circumstances be considered to be annoying.

It is therefore an object of the present invention to provide an exhaust seal for use in an articulated joint which will not squeak in response to sliding frictional forces resulting from the movement of the joint members.

Another object of the present invention is to provide a noiseless exhaust seal for use in an articulated joint of an automobile exhaust system which prevents exhaust gas leakage.

Still another object of the present invention is to provide a noiseless exhaust seal for use in an articulated joint of an automobile exhaust system which is not subject to cracking or crumbling during use.

A still further object of the present invention is to provide a noiseless exhaust seal for use in an articulated joint in an automobile exhaust system which provides increased protection from cracking or crumbling at the leading edge of the seal.

An additional object of the present invention is to provide a noiseless exhaust seal for use in an articulated joint in high temperature applications.

In accordance with the present invention, a heat cured exhaust seal, adapted to be interposed between a pair of confronting pipes in sealing relationship therewith, is formed of wire mesh having openings between the wires thereof and a mixture of metallic fibers, non-metallic filler, a thermally stable lubricant and resin binder, which mixture surrounds the wires and substantially fills the openings in the mesh and forms the seal. The method of forming the seal includes placing a preform of wire mesh into a die cavity, forming a powder mixture of metallic fibers, non-metallic filler, a thermally stable lubricant and a resin binder, placing the powder mixture into the die cavity, pressing the wire mesh and powder mixture to the final size and shape of the seal and curing the seal at an elevated temperature.

The above brief description as well as further objects, features and advantages of the present invention will be more fully understood by reference to the following detailed description of the presently prefered, but nonetheless, illustrative embodiments in accordance with the present invention, when taken in conjunction with the accompanying drawings, wherein.

Figure 1:
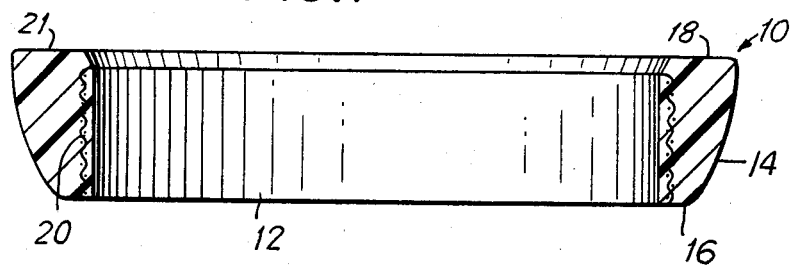
FIG. 1 is a sectional front elevation of one embodiment of the noiseless exhaust seal of the present invention.

Refering now to FIG. 1, the first embodiment of the noiseless exhaust seal of the present invention, designated generally by the reference character 10, is preferably an endless ring formed as shown, having an inner radial surface 12 and an outer radial surface 14, a leading edge 16 and a trailing edge 18. The seal 10 is typically used in exhaust systems for automobiles having transversely mounted engines, which is a common configuration in front wheel drive automobiles. While the seal 10 may be fabricated in a variety of different configurations, FIG. 1 shows a configuration for use in a ball and socket type joint (unshown) commonly used to connect the engine exhaust manifold to the tail pipe in automobiles having a transversely mounted engine.

The seal 10 is a heat cured seal formed of wire mesh, indicated in the finished seal by the reference numeral 20, having openings between the wires thereof and a compressed mixture of metallic fibers non-metallic filler, a thermally stable lubricant, such as silicone, and a resin binder, which compressed mixture, indicated in the finished seal by the reference numeral 21, surrounds the wires and substantially fills the openings in the wire mesh, and forms the seal 10. Specifically, seal 10 is formed by placing a cylindrical preform of wire mesh into a conventional compression die (unshown) having a cavity shaped and sized substantially the shape and size of the finished seal 10. A powder mixture of metallic fibers, non-metallic filler coated with a thermally stable lubricant and a resin binder is then poured into the die cavity. The die is designed in such a manner that compression force is applied axially to the knitted wire mesh and the powder mixture in the die cavity, all of which is compressed to the final size and shape of the seal 10. The seal 10 is then removed from the die cavity and cured at an elevated temperature. In FIG. 1 the wire mesh in the final seal is indicated by the reference character 20.

The wire mesh is preferably a two strand knitted wire mesh made of steel, although other materials having comparable strength and resiliency could be used as well. The mesh wire may have a diameter in the range of 0.0035 inches (0.089 mm) to 0.011 inches (0.279 mm) with the openings between adjacent wires in the mesh being preferably in the range of about 0.125 inches (3.18 mm) to 0.250 inches (6.35 mm). In order to form the seal 10, the wire mesh is preformed in the shape of a sleeve or donut prior to its placement around the core or center pin of the conformingly shaped die cavity. For example, electric resistance welds can connect the terminal ends of a length of knitted wire mesh to form the sleeve.

The axial height of the knitted wire mesh sleeve placed in the die cavity is substantially greater than the finished height of the seal 10. Specifically, the uncompressed height of the knitted wire mesh sleeve can range from approximately two to four times the height of the finished seal. It is preferred that the sleeve of knitted wire mesh fit snugly around the core or center pin of the die so that an annular space remains between the uncompressed knitted wire mesh sleeve and the outer wall of the die, thereby permiting the unrestricted entry of the powder mixture of metallic fibers, non-metallic filler coated with silicone and resin binder.

The metallic fibers of the powder mixture which is added to the die cavity is preferably made up of chopped steel wool, although chopped bronze wool or chopped metallic wire (e.g. brass, copper, steel, etc.) may also be employed. The non-metallic filler is preferably made up of graphite flakes, although boron nitride or mica may also be used. Further, the non-metallic filler may also include metallic oxide powders having refractory characteristics, such as titanium dioxide, in place of or in combination with the other filler materials.

Before the non-metallic filler material is mixed with the metallic fibers and resin binder to form the powder mixture, it is mixed with a fluid having a high lubricity and thermal stability, such as a silicone fluid. The lubricity of the fluid is believed important in achieving the noiseless operation of the finished seal, while the thermal stability of the fluid is thought to be necessary to allow the fluid to undergo curing without any drastic chemical changes. Mixing the thermally stable lubricant with the non-metallic filler serves to coat the particles with the lubricant, which is the presently preferred method of dispersing the lubricant throughout the powder mixture. However, it will be readily appreciated that any method which achieves a uniform dispersion of the components of the powder mixture may be employed.

A preferred silicone fluid is a silicone fluid of the dimethyl type although other silicone fluids such as phenyl based silicone fluid can be used for suitable applications. In the preferred embodiment of the present invention, dimethyl silicone fluid is thoroughly mixed with graphite flakes which constitute the non-metallic filler. It is thought that because of the laminar structure and porosity of the graphite flakes, the dimethyl silicone fluid coats the surface and penetrates the pores of the graphite flakes.

The thorough mixture of the thus coated graphite flakes with the metallic fibers and resin binder in the powder mixture assures the dispersion of the dimethyl silicone fluid or lubricant throughout the finished seal 10. It is believed that during use of the seal 10 in an automotive exhaust system, the interior portion of the seal does not reach temperatures sufficiently high to decompose the silicone fluid therein. As a result, it is theorized that there is a continuous exposure of small amounts of silicone fluid at the sliding surface of the seal 10 (the leading edge 16 and outer radial surface 14) which serves to modify the frictional forces acting thereon sufficiently to prevent squeaking.

The resin binder is preferably a phenolic resin although a furfural alcohol resin may also be used as well as any resin binder which provides a high carbon yield when pyrolyzed. Specifically, during normal use in an automotive exhaust system, the seal 10 is subjected to temperatures in excess of 600°–700° F. At these temperatures the phenolic resin binder decomposes into a carbonaceous mass. This carbonaceous mass in desirable as it serves as an extremely tenacious binder within the seal 10 and creates a gas impermeable barrier. It will therefore be appreciated that any resin binder providing a high carbon yield when pyrolyzed may be used.

The resultant powder mixture is preferably placed in the die cavity to approximately the same height as the width of the wire mesh prior to compression to form the the seal 10. When the powder mixture and knitted wire mesh are compressed, the knitted wire structure buckles in a random but rather uniform manner, extending somewhat radially into the densified compressed powder mixture. The resultant composite structure provides superior interlocking and strengthening properties. Typical compression stresses for forming a seal are in the vicinity of 35,000 PSI but higher or lower stresses could be used to accomodate various shapes and material ratios.

The compressed seal is then cured in a furnace at temperatures in the range of 375° to 425° F. for approximately 30 minutes. This curing process permits the resin binder to exhibit its adhesive properties to further bond the powder mixture and wire mesh of the seal 10.

Figure 2:
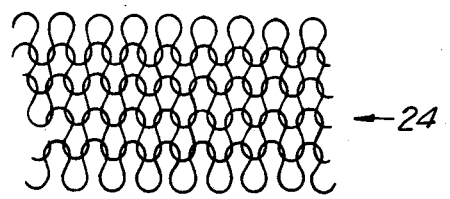
FIG. 2 is a front elevation of the wire mesh used in the formation of a second embodiment of the seal of the present invention shown in FIG. 4.
Figure 3:
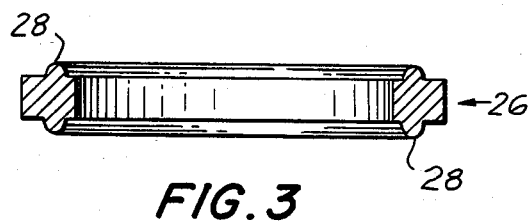
FIG. 3 is a sectional front elevation of a ring of partially compressed wire mesh formed from the wire mesh shown in FIG. 2 and utilized in the second embodiment of the seal of the present invention shown in FIG. 4.
Figure 4:
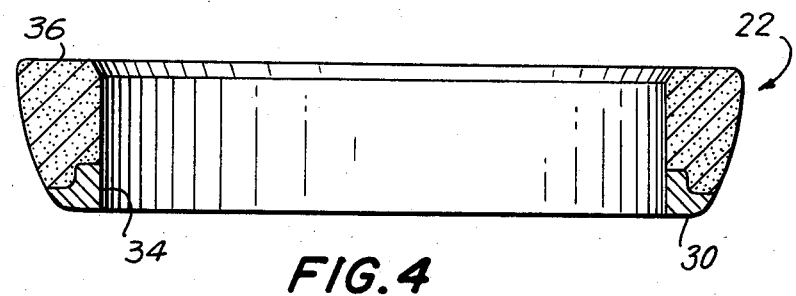
FIG. 4 is a sectional front elevation of the second embodiment of the seal of the present invention.

FIGS. 2, 3 and 4, illustrate the presently preferred embodiment of the seal of the present invention which is indicated by the reference character 22 and shown in FIG. 4. To form the seal 22 a cylindrical preform of knitted wire mesh 24 (FIG. 2) is placed into a die cavity shaped substantially the same as the annular ring 26 shown in FIG. 3. The wire mesh 24 is then partially compressed to form the ring 26. The preferred density of the partially compressed wire mesh ring 26 is in the range of about 20 to 35% and the ring 26 is sized so that it will drop freely into a second compression die cavity shaped substantially the same as the finished seal 22. It will be readily appreciated that while the partially compressed ring 26, may take the shape of the mesh ring shown in FIG. 3., i.e. with crowns 28 formed on the top and bottom thereof, any suitable shape may be employed.

The powder mixture described above is poured into the second die cavity containing ring 26 and the mixture and ring are then compressed to the size and shape of the final seal 22, which seal is then cured at an elevated temperature. In the final seal 22 shown in FIG. 4 the compressed wire mesh is indicated by the reference numeral 34 and located at the leading edge 30 of the seal 10, and the compressed powder mixture is indicated by the reference numeral 36.

Utilization of a partially compressed knitted wire mesh ring 26 serves to concentrate the wire mesh at the leading edge 30 of the seal 22. The concentration of the wire mesh at this location provides increased protection against the cracking or crumbling of the leading edge of the seal which might otherwise occur under severe operating conditions. It should be noted that while it is desirable to concentrate the wire mesh at the leading edge of the seal, exposure of the naked wires of the mesh at the surface of the seal is not desired as squeaking and a weakening of the seal will result. This is prevented by the use of the powder mixture which is added to the die cavity and which penetrates the wire mesh during the final compression resulting in the finished seal.

Specifically, during the final compression operation, a portion of the powder mixture 36 of metallic fibers, non-metallic filler coated with silicone and resin binder which forms the seal 22 is forced into and around the wire mesh ring 26 which ring is further compressed during the final compression. As such, a very tight mechanical bond is achieved between the powder mixture and the wire mesh through the interlocking of the mixture with the mesh wires and the adhesive forces exerted by the resin binder. As seen in FIG. 4, after the final compression of the seal, the wire mesh ring is deformed, as indicated by the reference numeral 34 in FIG. 4, so as to provide sufficient cross-section at the leading edge of the seal, to afford mechanical protection against the cracking or crumbling of the seal which might otherwise occur under severe operating conditions. After final compression, the seal is cured at an elevated temperature.

EXAMPLE 1

A seal of the type shown in FIG. 1 and described above, having a finished height of about 0.5 inches (1.27 cm) and an inner diameter of about 2.0 inches (5.08 cm) can be manufactured as follows.

A sleeve of double stranded knitted steel wire mesh having a flattened width of about 3.0 inches, a length or height of about 2.0 inches and a weight of about 0.141 oz is degreased by dipping it in a degreasing solution or by any other conventional means. The diameter of the mesh wire is preferably about 0.011 inches (0.279 mm) and the openings between adjacent mesh wires preferably extend from about 0.125 inches (3.18 mm) to 0.250 inches (6.35 mm). The wire mesh is then placed in a die cavity shaped substantially the same as the finished seal 10.

The non-metallic filler coated with silicone is prepared by mixing about 0.435 oz of graphite flakes, such as the #3 Graphite Flakes sold by Asbury Graphite Mills Inc., of Asbury Park, N.J., with about 0.028 oz of a dimethyl silicone fluid, such as that sold under the designation GE# SE 96-350 by the General Electric Co. The mixing of the silicone fluid and the graphite flakes is performed on a ball mill for about 60 minutes. The thus coated graphite flakes are then mixed with 0.969 oz of chopped steel wool, which forms the metallic fibers, and 0.277 oz of phenolic resin, such as that sold under the designation DUREZ 9841 by the Occidental Chemical Co., which forms the resin binder.

The chopped steel wool, silicone coated graphite flakes and phenolic resin are mixed for approximately 30 minutes and the resultant powder mixture is poured into the die cavity where it surrounds the wire mesh sleeve. A 50 ton load is then used to compress the wire mesh and powder mixture to the configuration of the final seal 10 shown in FIG. 1. The compressed seal is then ejected from the die and placed in a furnace set at 400° F. for about 30 minutes in order to affect curing. The cured seal is removed from the furnace and allowed to cool at room temperature.

EXAMPLE 2

A seal of the type shown in FIG. 4 and described above, having a finished height of about 0.5 inches (1.27 cm) and an inner diameter of about 2.0 inches (5.08 cm) can be manufactured as follows.

A sleeve of double stranded knitted steel wire mesh having a flattened width of about 3.0 inches, a length or height of about 2.0 inches and a weight of about 0.141 oz is degreased by dipping it in a degreasing solution or by any other conventional means. The diameter of the mesh wire is preferably about 0.011 inches (0.279 mm) and the openings between adjacent mesh wires preferably extend from about 0.125 inches (3.18 mm) to 0.250 inches (6.35 mm). The wire mesh is then placed in a first die cavity shaped substantially the same as the annular ring 26 shown in FIG. 3. A 3 to 5 ton load is applied to the wire mesh to compress it to the shape of the annular ring 26 shown in FIG. 3. The density of the partially compressed ring is in the range of about 20 to 35%. The partially compressed ring of wire mesh is then placed in a second die cavity shaped substantially the same as the seal 22 shown in FIG. 4.

The non-metallic filler coated with silicone is prepared by mixing about 0.435 oz of graphite flakes, such as the #3 Graphite Flakes sold by Asbury Graphite Mills Inc., with about 0.028 oz of a dimethyl silicone fluid, such as that sold under the designation GE# SF 96-350 by the General Electric Co. The mixing of the silicone fluid and the graphite flakes is performed on a ball mill for about 60 minutes. The thus coated graphite flakes are then mixed with 0.969 oz of chopped steel wool, which forms the metallic fibers, and 0.277 oz of phenolic resin such as that sold under the designation DUREZ 9841 by the Occidental Chemical Co., which forms the resin binder.

The chopped steel wool, silicone coated graphite flakes and phenolic resin are mixed for approximately 30 minutes and the resultant powder mixture is poured into the second die cavity over the ring of wire mesh 26. A 50 ton load is then used to compress the wire mesh and powder mixture to the configuration of the final seal 10 as shown in FIG. 4. The compressed seal is then ejected from the die and placed in a furnace set at 400° F. for about 30 minutes in order to affect curing. The cured seal is removed from the furnace and allowed to cool at room temperature.

As will be readily apparent to those skilled in the art, the invention may be used in other specific forms or for other purposes without departing from its spirit or central characteristics. The present embodiments are therefore to be considered as illustrative and not restrictive, the scope of the invention being indicated by the claims rather than by the foregoing description, and all embodiments which come within the range of equivalences of the claims are intended to be embraced.

We claim:

1. A heat cured exhaust seal adapted to be interposed between a pair of confronting pipes in sealing relationship therewith, comprising wire mesh having openings between the wires thereof and a mixture of metallic fibers, non-metallic filler, a thermally stable lubricant and a resin binder, the mixture surrounding the wires and substantially filling the openings in the wire mesh and forming the seal.

2. The composition of claim 1 in which the metallic fibers comprise chopped steel wool.

3. The composition of claim 2 in which the non-metallic filler comprises graphite flakes.

4. The composition of claim 3 in which the resin binder comprises phenolic resin.

5. The composition of claim 4 in which the thermally stable lubricant comprises silicone fluid.

6. The composition of claim 1 in which the thermally stable lubricant is coated on the non-metallic filler.

7. The composition of claim 1 in the wire mesh is substantially concentrated in a portion of the seal.

* * * * *